United States Patent
Ochi et al.

(10) Patent No.: US 6,334,833 B1
(45) Date of Patent: Jan. 1, 2002

(54) CONTROL APPARATUS FOR AUTOMATIC TRANSMISSION AND CONTROL METHOD FOR AUTOMATIC TRANSMISSION

(75) Inventors: Tatsuya Ochi, Hitachi; Toshimichi Minowa, Mito, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/320,840

(22) Filed: May 26, 1999

(30) Foreign Application Priority Data

May 29, 1998 (JP) .......................................... 10-148692

(51) Int. Cl.⁷ ............................................. F16H 51/12
(52) U.S. Cl. ........................ 477/143; 477/906; 701/58
(58) Field of Search ................................ 477/154, 155, 477/156, 143, 906; 192/111 A, 111 R; 701/58, 59, 60

(56) References Cited

U.S. PATENT DOCUMENTS

| | | | | |
|---|---|---|---|---|
| 4,440,279 A | * | 4/1984 | Schreiner .............. | 192/111 A X |
| 4,653,350 A | * | 3/1987 | Downs et al. .......... | 477/154 X |
| 4,742,461 A | * | 5/1988 | Eschrich et al. ....... | 477/143 X |
| 4,846,021 A | * | 7/1989 | Hamano et al. ........ | 477/154 |
| 4,870,581 A | * | 9/1989 | Ito et al. ............. | 477/154 X |
| 4,913,004 A | * | 4/1990 | Panoushek et al. ..... | 477/143 X |
| 4,998,451 A | * | 3/1991 | Sano .................. | 477/155 X |
| 5,016,174 A | * | 5/1991 | Ito et al. ............. | 477/906 X |
| 5,376,058 A | * | 12/1994 | Ueda .................. | 192/111 A X |
| 5,683,328 A | * | 11/1997 | De Schepper et al. .. | 477/154 X |
| 5,976,057 A | * | 2/1999 | Mori .................. | 477/154 X |
| 6,095,948 A | * | 8/2000 | Depping et al. ........ | 477/143 |

FOREIGN PATENT DOCUMENTS

| | | |
|---|---|---|
| JP | 6-341527 | 12/1994 |
| JP | 8-312772 | 11/1996 |

* cited by examiner

Primary Examiner—Charles A. Marmor
Assistant Examiner—Ankur Parekh
(74) Attorney, Agent, or Firm—Crowell & Moring, LLP

(57) ABSTRACT

With a specific shift pattern, a chronological aging of a clutch used in a friction engagement is judged and an obtained judgement result is reflected to other shifts to which the clutch contributes. A control apparatus for an automatic transmission and a control method for an automatic transmission are provided so that even when the clutch used in the friction engagement is presented with chronological aging, in all shift operations, a good shift characteristic can be obtained.

6 Claims, 6 Drawing Sheets

| SHIFT PATTERN | CLUTCH A | CLUTCH B | CLUTCH C |
|---|---|---|---|
| 1-2 | 0 | 0 | 1 |
| 1-3 | 0 | 1 | 0 |
| 1-4 | 2 | 1 | 1 |
| 2-1 | 0 | 0 | 2 |
| 2-3 | 0 | 1 | 2 |
| 2-4 | 2 | 1 | 0 |
| 3-1 | 0 | 2 | 0 |
| 3-2 | 0 | 2 | 1 |
| 3-4 | 2 | 0 | 1 |
| 4-1 | 1 | 2 | 2 |
| 4-2 | 1 | 2 | 0 |
| 4-3 | 1 | 0 | 2 |

FIG. 7

| TROUBLE CODE | FAULT SIGNAL | DIAGNOSIS CONTENTS |
|---|---|---|
| 11 | LINEAR SOLENOID A | WIRE BRAKING OR SHORT CIRCUIT OF SOLENOID DRIVE CIRCUIT |
| 12 | LINEAR SOLENOID B | 〃 |
| 13 | LINEAR SOLENOID C | 〃 |
| 21 | CLUTCH A | CHRONOLOGICAL AGING OR ABNORMALITY OF CLUTCH |
| 22 | CLUTCH B | 〃 |
| 23 | CLUTCH C | 〃 |
| 31 | THROTTLE SENSOR SYSTEM | WIRE BRAKING OR SHORT CIRCUIT OF SIGNAL INPUT CIRCUIT |
| 32 | VEHICLE SPEED SENSOR 1 | NON-INPUT OF VEHICLE SPEED PULSE |

FIG. 8

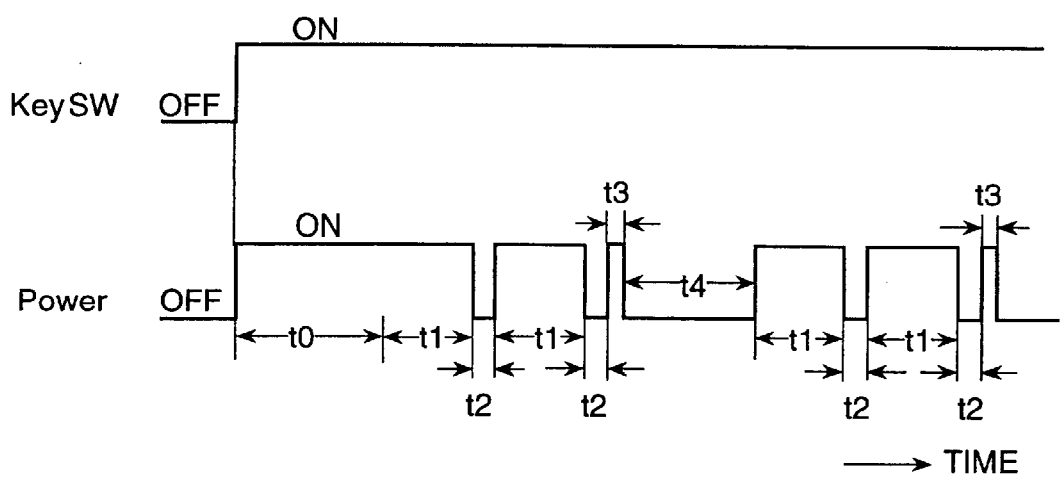

CONTROL APPARATUS FOR AUTOMATIC TRANSMISSION AND CONTROL METHOD FOR AUTOMATIC TRANSMISSION

BACKGROUND OF THE INVENTION

The present invention relates to a control apparatus for an automatic transmission and a control method for an automatic transmission. In particular, the invention relates to a control apparatus for an automatic transmission for controlling a hydraulic pressure employed in a shift of the automatic transmission for use in an automobile, and to a control method for an automatic transmission for controlling a hydraulic pressure employed in a shift of the automatic transmission for use in an automobile.

As one kind of a control method for an automatic transmission for use in an automobile according to the prior art, there is a technique, for example, as described in Japanese application patent laid-open publication No. Hei 6-341527. In this control method, a time from a torque phase start to an inertia phase start during shifting of the automatic transmission is measured, chronological aging (an aged deterioration) of a disengagement side clutch (a disengagement side friction engagement means) is assumed by the measured time, and then an establishment value of a hydraulic pressure of the above stated disengagement side clutch in the automatic transmission is corrected.

As to the torque phase of the automatic transmission, when paying attention to the time change about an output shaft torque To of the automatic transmission, namely an output shaft torque signal (To signal, to be discussed later), the above stated torque phase indicates a period in which, during a shifting start time from a first gear ratio (a first speed) and a second gear ratio (a second speed), a gear ratio Gr, namely a gear ratio Gr signal, does not change. Instead, only the output shaft torque To signal changes.

Further, the inertia phase is a period in which, after the torque phase, the clutch, which is the friction engagement means of the automatic transmission, begins to engage and the gear ratio Gr changes.

However, as described in the Japanese application laid-open patent publication No. Hei 6-341527 mentioned above, chronological aging of a specific friction engagement means (a specific clutch) in a specific shift pattern of the automatic transmission is detected and a hydraulic pressure command value is corrected in every shift pattern, such as 1–2 shift and a 2–3 shift. With respect to a respective engagement side clutch and a respective disengagement side clutch, it is necessary to have a way to judge chronological aging (the aged deterioration).

According to the shift pattern, for example, in a case of a 4–1 shift, since all three clutches are engaged and disengaged, it is difficult to judge chronological aging separately for every clutch. As a result, a problem is caused in which a suitable hydraulic pressure correction during the chronological aging in the automatic transmission is not practiced.

Further, as another kind of a control method for an automatic transmission for use in an automobile, there is, for example, Japanese application patent laid-open publication No. Hei 8-312772. In the control method for the automatic transmission according to this second example of prior art, a first gear ratio pattern (a first shift pattern or a first speed pattern) and a second gear ratio pattern (a second shift pattern or a second speed pattern) are obtained by engaging a friction engagement means (a clutch), a hydraulic pressure correction is practiced, and then a learning and a control for the automatic transmission is attained.

With respect to a respective engagement side clutch and a respective disengagement side clutch, it is necessary to have a way in which to judge the chronological aging (the aged deterioration). However, according to the shift pattern, it is difficult to judge chronological aging separately for every clutch. As a result, a problem is caused in which a suitable hydraulic pressure correction during chronological aging in the automatic transmission is not practiced.

Namely, in the above stated control method for the automatic transmission according to this second example of the prior art, there is suggestion of employing a characteristic value of the friction engagement means (the clutch) and, further, there is no suggestion of a countermeasure for chronological aging in the automatic transmission.

SUMMARY OF THE INVENTION

An object of the present invention is to provide a control apparatus for an automatic transmission and a control method for an automatic transmission wherein, when chronological aging of a specific friction engagement means in a specific shift pattern is judged, by correcting a hydraulic pressure command value in the automatic transmission at another shift pattern to which the above stated friction engagement means contributes, even with chronological aging in some friction engagement means, at all shifts, a good shift characteristic in the automatic transmission can be obtained.

To solve the above stated problems, according to the present invention, in a control apparatus for an automatic transmission in which a shift for the automatic transmission is practiced by engaging and releasing a predetermined friction engagement means in the automatic transmission connected to an engine, during the shift for the automatic transmission, a hydraulic pressure which acts on the predetermined friction engagement means is pressure regulated and, further, the control apparatus comprises a pressure regulation command generation means enabling a change in a pressure regulation characteristic. The control apparatus for the automatic transmission comprises an operation condition recognition means for recognizing at least a shift pattern and an engine load, a chronological aging judgment means for judging a chronological aging of the predetermined friction engagement means which contributes to the shift for the automatic transmission, and a characteristic value store means for storing a characteristic value of the predetermined friction engagement means. When the friction engagement means is judged to have a chronological aging, the characteristic value stored in the characteristic value store means is changed.

According to the present invention, in a control apparatus for an automatic transmission which is connected to an engine having a predetermined friction engagement means for engaging and disengaging to practice a shift for the automatic transmission, the control apparatus for the automatic transmission comprises a hydraulic pressure regulation command generation means which, during shifting of the automatic transmission, is for regulating a hydraulic pressure which acts on the predetermined friction engagement means and for changing a hydraulic pressure regulation characteristic, an operation condition recognition means for recognizing a shift pattern and an engine load, a chronological aging judgment means for judging a chronological aging of the predetermined friction engagement means which contributes to the shift for the automatic transmission, and a characteristic value store means for storing a characteristic value of the predetermined friction engagement means.

According to the present invention, in a control method for an automatic transmission which is connected to an engine in which a shift for the automatic transmission is practiced by engaging and disengaging a predetermined friction engagement means, the control method for the automatic transmission comprises the steps of controlling an output shaft torque of the automatic transmission during shifting of the automatic transmission by regulating a hydraulic pressure which acts on the predetermined friction engagement means, recognizing a shift pattern and an engine load, judging a chronological aging of the predetermined friction engagement means which contributes to the shift for the automatic transmission, and, when the predetermined friction engagement means is judged to present chronological aging, changing a characteristic value of the predetermined friction engagement means.

BRIEF DESCRIPTION OF THE DRAWINGS

FIG. 7 is a table showing one example of kinds and contents of the alarm and showing one example of trouble codes, fault signals and diagnosis contents; and FIG. 8 is a time chart showing one example of the trouble code of FIG. 7.

DESCRIPTION OF THE INVENTION

Figure 1:
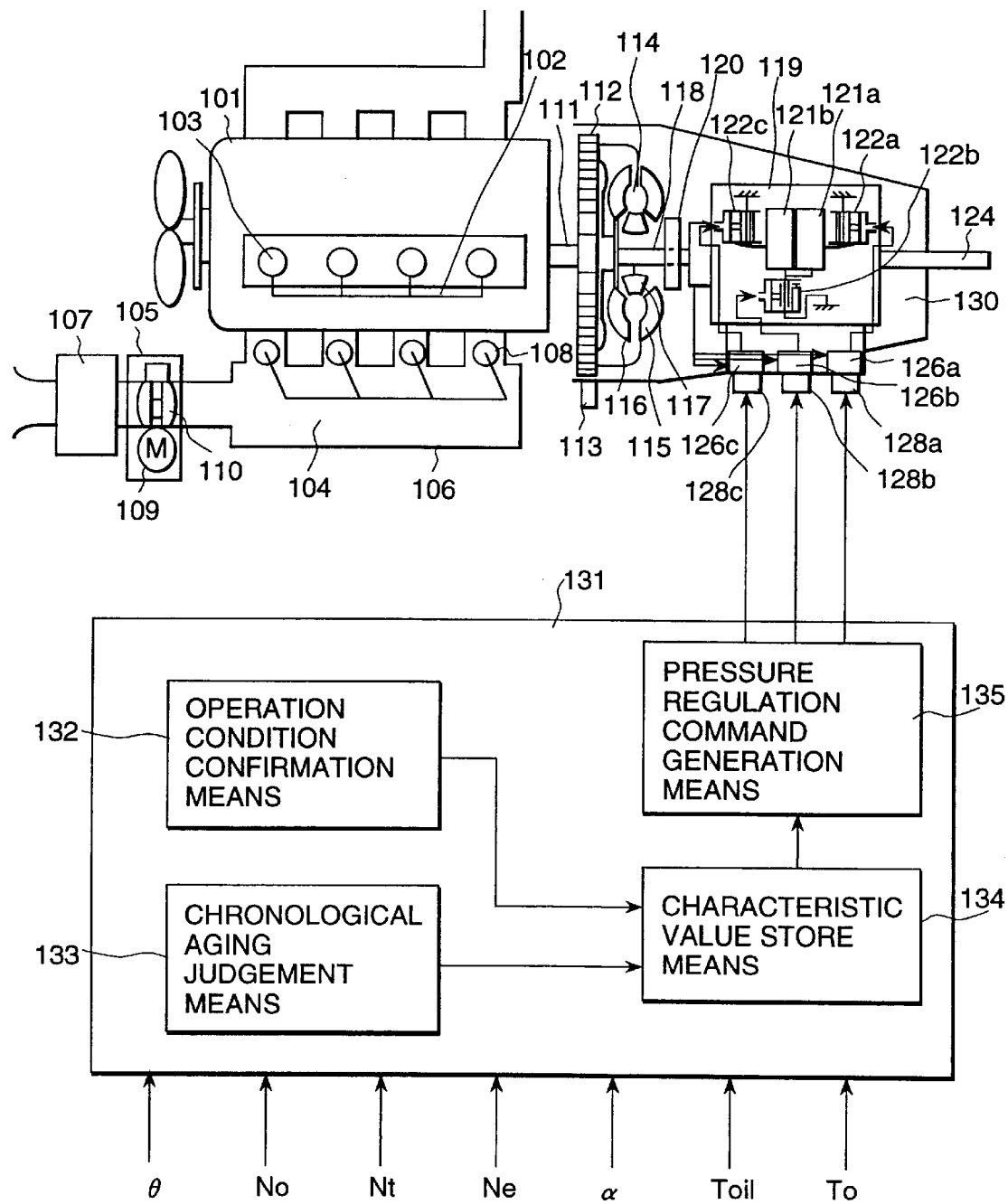
FIG. 1 is a schematic view showing an automatic transmission construction of a first control method and apparatus embodiment for an automatic transmission according to the present invention.

Hereinafter, a control apparatus for an automatic transmission for use in an automobile and a control method for an automatic transmission for use in an automobile of one embodiment according to the present invention will be explained in detail referring to the drawings.

FIG. 1 is a schematic view showing a control apparatus construction for an automatic transmission of a first embodiment according to the present invention.

An internal combustion engine 101 is a four-cylinder type internal combustion engine for use in an automobile in this first embodiment according to the present invention. To this engine 101, an ignition apparatus 102 is provided. This ignition apparatus 102 has four ignition plugs 103 in correspondence with a number of cylinders of the engine 101.

To an air intake conduit 104 for taking the air into the engine 101, an electronically controlled throttle valve means 105 for adjusting a flow amount of the air which passes through this throttle valve means 105, a fuel injection means 106 for injecting the fuel, and an air flow amount meter 107 are provided. The fuel injection means 106 has four fuel injectors 108 in correspondence to the number of the cylinders of the engine 101. The electronically controlled throttle valve means 105 controls an air flow amount to the engine 101 by driving a throttle valve 110 according to an actuator 109 for driving the throttle valve 110.

Further, in a common automobile, the throttle valve 110 and an acceleration pedal (not shown in this figure) are connected through a mechanical wire (not shown in this figure) and then the throttle valve 110 and the acceleration pedal can be operated one by one.

To a crank shaft 111 of the engine 101, a fly wheel member 112 is installed. To this fly wheel member 122, an engine rotation sensor 113 for detecting a rotation number of the crank shaft 111, namely for detecting an engine rotation number Ne, is installed. A torque converter 114 which is connected directly to the fly wheel member 112 is comprised of a pump 115, a turbine 116, and a stator 117.

An output shaft of the turbine 116, namely a torque converter output shaft 118, is connected directly to a gear ratio step-wise automatic transmission 119. To the torque converter output shaft 118, a turbine rotation number measuring sensor 120 for measuring a turbine rotation number Nt is installed.

A shift mechanism 119 of this embodiment is made of planetary gears 121a and 121b and three friction engagement means (three clutches) 122a, 122b and 122c. By engaging with or by disengaging from the three friction engagement means 122a, 122b and 122c, a gear ratio of the respective planetary gears 121a and 121b is changed, and then a shift of an automatic transmission 130 can be made.

These friction engagement means 122a, 122b and 122c are controlled respectively according to three spool valves 126a, 126b and 126c and according to three linear solenoids (three pressure regulation means) 128a, 128b and 128c. Further, the shift mechanism 119 is connected to an output shaft 124 of the automatic transmission 130. The automatic transmission 130 for use in the automobile of this first embodiment according to the present invention is constituted by these above stated various components.

The engine 101 and the actuator 109 for driving the automatic transmission 130 explained above are controlled through a control controller 131. To this control controller 131, a throttle valve opening degree θ, an output shaft rotation number No of the automatic transmission 130, a turbine rotation number Nt of the automatic transmission 130, an engine rotation number Ne, an oil temperature or a hydraulic oil temperature Toil of the automatic transmission 130, and an acceleration pedal step-in amount α, etc. are inputted and are used for the control of the engine 101.

Further, in a specific system, an output shaft torque To of the automatic transmission 130 is detected using a torque sensor (not shown in this figure) which is installed to the output shaft 124 of the automatic transmission 130, and this output shaft torque To of the automatic transmission 130 is taken in the control controller 131.

As one embodiment of the control apparatus for the automatic transmission according to the present invention, an operation condition recognition means 132 in the control controller 131 recognizes and stores a shift pattern and an engine load. Such an engine load is, for example, the throttle valve opening degree, etc. Next, in a chronological aging judgement means (an aged deterioration judgement means) 133, using a shift characteristic, a chronological aging condition of the friction engagement means 122a, 122b and 122c mentioned above is judged. A judgement manner for the chronological aging is carried out using a shift time, a gear ratio Gr signal or an assumption value of the output shaft torque To, etc., and this chronological aging judgment manner will be explained in detail later.

Next, a characteristic value store means 134 stores respective characteristic values of the friction engagement means 122a, 122b and 122c. As an example, the characteristic value is a value of coefficient of friction of the respective friction engagement means 122a, 122b and 122c. Such a value of coefficient of friction in a shipment of the above stated friction engagement means 122a, 122b and 122c is stored in advance and, in response to the chronological aging condition, the respective characteristic values of the friction engagement means 122a, 122b and 122c are changed.

Next, in a pressure regulation command generation means 135, a hydraulic pressure command value, in which a good shift characteristic in the automatic transmission 130 is obtainable during shifting, is calculated and the hydraulic pressure command value is outputted to the respective linear solenoids 128a, 128b and 128c.

In the above stated pressure regulation command generation means 135, an operation condition of the automatic transmission 130, an hydraulic pressure command in response to an ATF (an automatic transmission fluid) oil temperature, and a value of coefficient of friction of the respective friction engagement means (the respective clutches) 122a, 122b and 122c, etc., are stored, and, further, the hydraulic pressure of the automatic transmission 130 suited to the operation condition of the engine 101 is calculated.

Figures 2, 6:
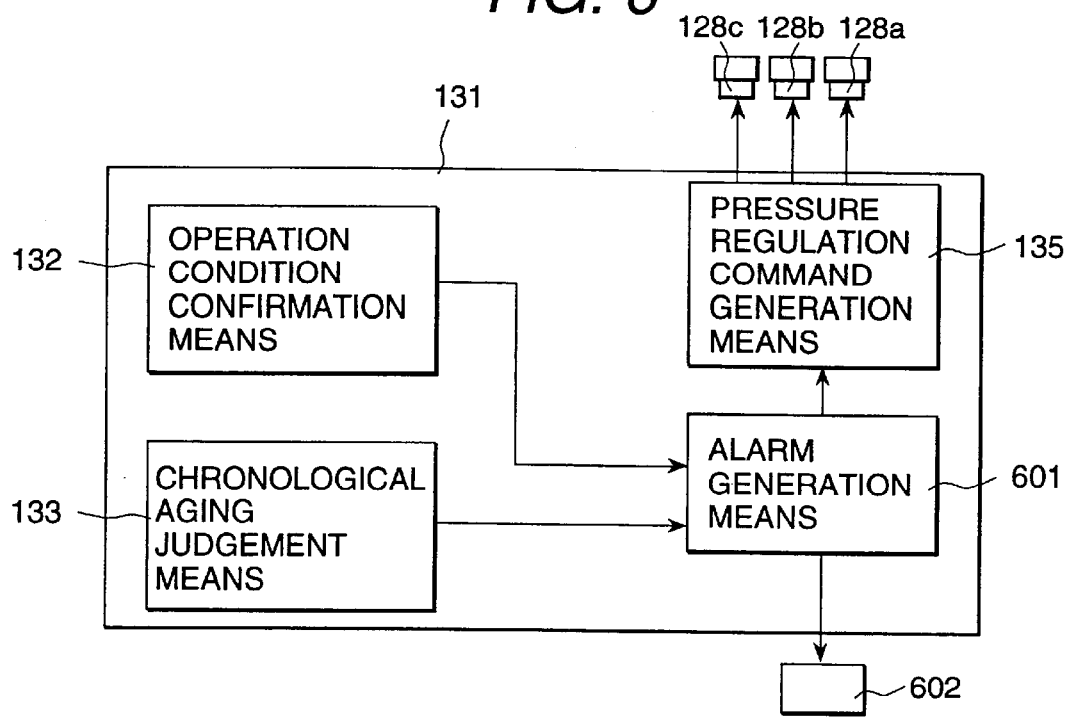
FIG. 2 is a map showing a relationship between a shift pattern and engagement and disengagement of a clutch forming a friction engagement means of the control method and apparatus of the first embodiment.
FIG. 6 is a schematic view showing an automatic transmission construction of a second control method and apparatus embodiment for an automatic transmission according to the present invention.

FIG. 2 is a map showing a relationship between a shift pattern and an engagement and a disengagement of the clutch (the friction engagement means) according to a control apparatus for an automatic transmission and a control method for an automatic transmission of a first embodiment according to the present invention.

In a four-speed automatic transmission for use in the automobile, there are three clutches A, B and C for carrying out the shift for the automatic transmission. A reference numeral "1" in the respective clutches A, B and C shown in FIG. 2 indicates engaging the clutch from a disengagement state and a reference numeral "2" in the respective clutches A, B and C indicates disengaging the clutch from an engagement state. Further, "0" in the respective clutches A, B and C indicates that the clutch is held at a last state and the last state is not varied, namely the clutch is left to maintain the engagement state or the disengagement state.

For example, in a case of 4–3 shift, a clutch A (a friction engagement means A) is engaged from the disengagement state and a clutch B (a friction engagement means B) is held in the existing state or the last state. Further, a clutch C (a friction engagement means C) is disengaged from the engagement state. As a result, the 4–3 shift in the automatic transmission for use in the automobile can be realized.

In a case where, during shifting, the chronological aging of the respective clutches A, B and C in the automatic transmission is subjected to judge, for example, a 4–1 shift, since all the three clutches A, B and C are engaged and disengaged, it is very difficult to separate the operation of the respective clutches A, B and C of the automatic transmission in accordance with the characteristic during shifting. It is also very difficult to judge the chronological aging condition in the automatic transmission.

In the control apparatus for the automatic transmission and the control method for the automatic transmission of the first embodiment according to the present invention, the chronological aging judgement is carried out only for the shift patterns which are shown in three mesh portions in FIG. 2 and the respective comparatively simple operation of the specific clutches A, B and C during shifting.

In other words, the chronological aging condition of the respective clutches A, B and C of the automatic transmission is judged with at least one shift pattern of the respective clutches A, B and C and an obtained result is reflected in the other shift patterns. For example, as to the clutch A, at a 4–3 shift pattern, the chronological aging condition of the clutch A is judged, as to the clutch B, at a 3–1 shift pattern, the chronological aging condition of the clutch B is judged and, further, as to the clutch C, at a 2–1 shift pattern, the chronological aging condition of the clutch C is judged.

Therefore, in this first embodiment according to the present invention, the respective shift pattern and the chronological aging judgment logic of the respective clutches A, B and C in the automatic transmission are unnecessary. As a result, a capacity of the programs can be reduced and further, even in the shift pattern in which the chronological aging judgement is difficult, it is possible to maintain the good shift characteristic for the automatic transmission.

Figure 3:
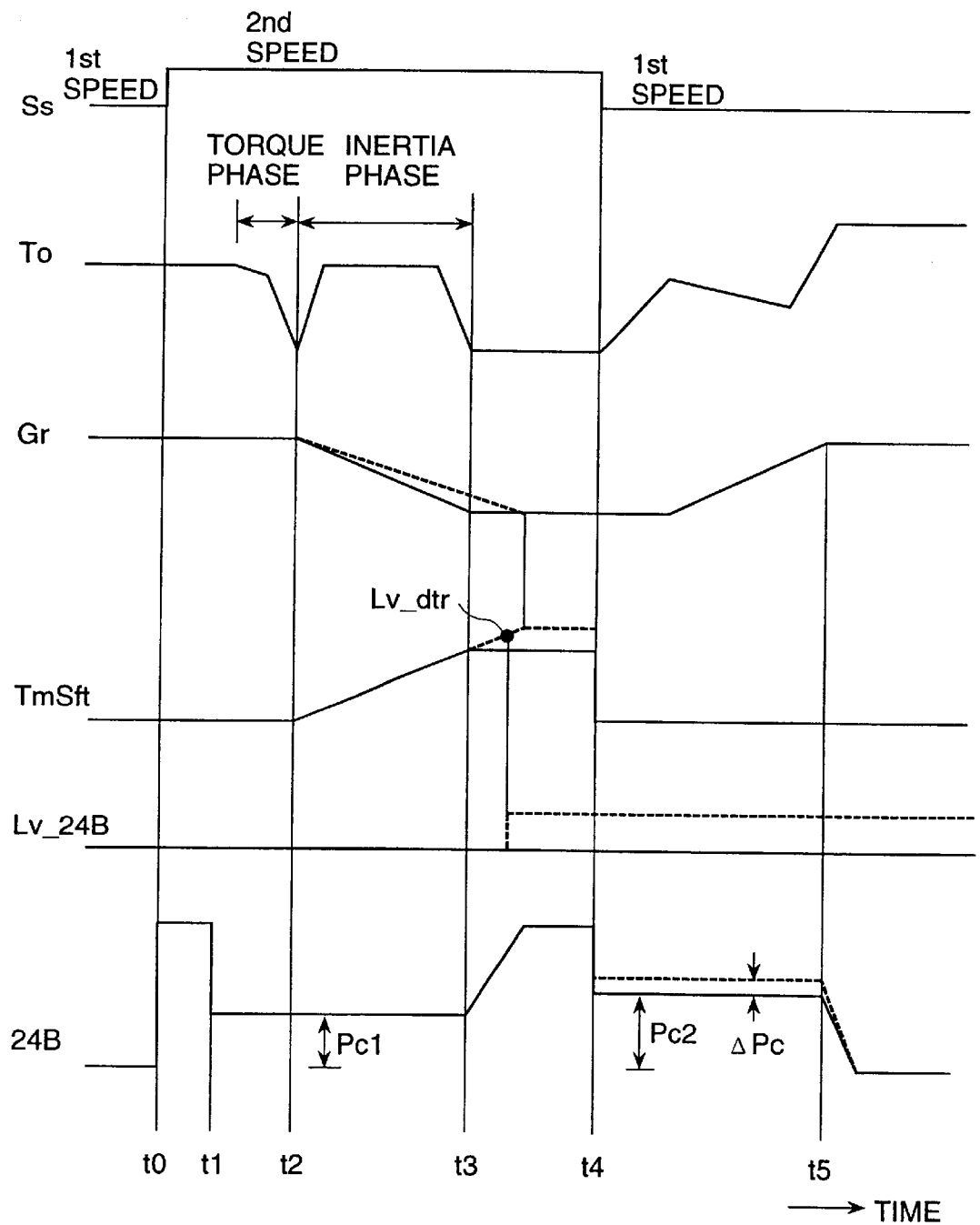
FIG. 3 is a time chart of a chronological aging judgement of the clutch forming the friction engagement means of the control method and apparatus of the first embodiment.

FIG. 3 shows a time chart during the chronological aging judgement in the automatic transmission. At first, at a time t0, a shift command signal (hereinafter called "Ss") changes from a first gear ratio (a first speed or a first shift) to a second gear ratio (a second speed or a second shift).

In a 1–2 shift, the clutch C is engaged from the disengagement state. A hydraulic pressure command value of the clutch C is a reference numeral 24B shown in FIG. 3. At first, to improve a responsibility performance of the hydraulic pressure, between a time t0–t1, the hydraulic pressure command value 24B of the clutch C rises temporally and then a pre-charge control of the hydraulic pressure of the clutch is carried out.

After that, according to the operation condition of the automatic transmission, a hydraulic pressure command value Pc1 is established and the characteristic during shifting becomes good under this hydraulic pressure command value Pc1. Next, the clutch C begins to carry out the engagement, enters into the torque phase, and a shift output shaft torque (hereinafter, called "To") lowers. After that, at a time t2, when a one-way clutch is disengaged, a gear ratio (hereinafter, called "Gr") begins to change and shifting occurs (the inertia phase).

Further, during shifting, a timer (hereinafter called "TmSft") counts a time required for the shift, and this counted time is used for the chronological aging judgement of the clutch C. Next, at a time t3, when the shift is finished, the hydraulic pressure command value 24B rises to engage surely the clutch C, and then a second shift condition is reached (a second speed normal state or a second gear ratio normal state).

Next, at a time t4, the shift command signal Ss is changed, and when a 2–1 shift command is generated, the clutch C is disengaged from the present engagement state. A hydraulic pressure command value Pc2 of the hydraulic pressure command value 24B is established similar to the 1–2 shift time, and a good characteristic during shifting can be obtained under this hydraulic pressure command value Pc2. When the disengagement of the clutch C begins, the gear ratio Gr rises during shifting. After that, at a time t5, the one-way clutch is engaged and the hydraulic pressure command value 24B is lowered to zero (0) to disengage surely the clutch C, and a first shift condition or a first speed normal state is reached.

When the chronological aging of the clutch C is changed, a wave form signal, as shown in a broken line in FIG. 3, is presented. In a 1–2 shift, when the chronological aging is generated in the clutch C, it is impossible to engage under the clutch hydraulic pressure command value Pc1. A slip state is then generated and, accordingly, the shift time is elongated. The counted number in the timer "TmSft" becomes large and reaches a chronological aging judgement level (Lv-dtr), and a chronological aging flag (hereinafter called "Lv__24B") is established. With the above stated facts, it is judged that the clutch C in the automatic transmission presents the chronological aging state.

Next, when a 2–1 shift is carried out in this state, under the hydraulic pressure command value 24B and the above stated hydraulic pressure command value Pc2, the shift characteristic becomes wrong. However, in this case, since the chronological aging flag Lv__24B is established, the clutch C of the automatic transmission is judged to have chronological aging, and then the hydraulic pressure command value 24B is performed to correct the hydraulic pressure command value Pc2; such a chronological aging correction amount ($\Delta Pc$) is shown in FIG. 3.

When the clutch C is disengaged under the chronological aging state, since the clutch C is disengaged abruptly, the above stated chronological aging correction value ($\Delta Pc$) is established, and the correction amount ($\Delta Pc$) is added to the hydraulic pressure command value Pc2. Of course, in a next 1–2 shift operation, since the chronological aging flag Lv-24B is established, there is similarly the hydraulic pressure establishment to which the chronological aging correction amount ($\Delta Pc$) is added.

With the above stated control logic for the control apparatus for the automatic transmission or for the control method for the automatic transmission according to the present invention, according to the specific shift pattern, since the chronological aging of the specific clutch C is judged, it is possible to reflect the obtained result in the other shifts contributed to by this clutch C. As a result, the program capacity for the chronological aging judgement in the automatic transmission can be restrained and a reduced cost of the control unit of the automatic transmission can be attained.

Figure 4:
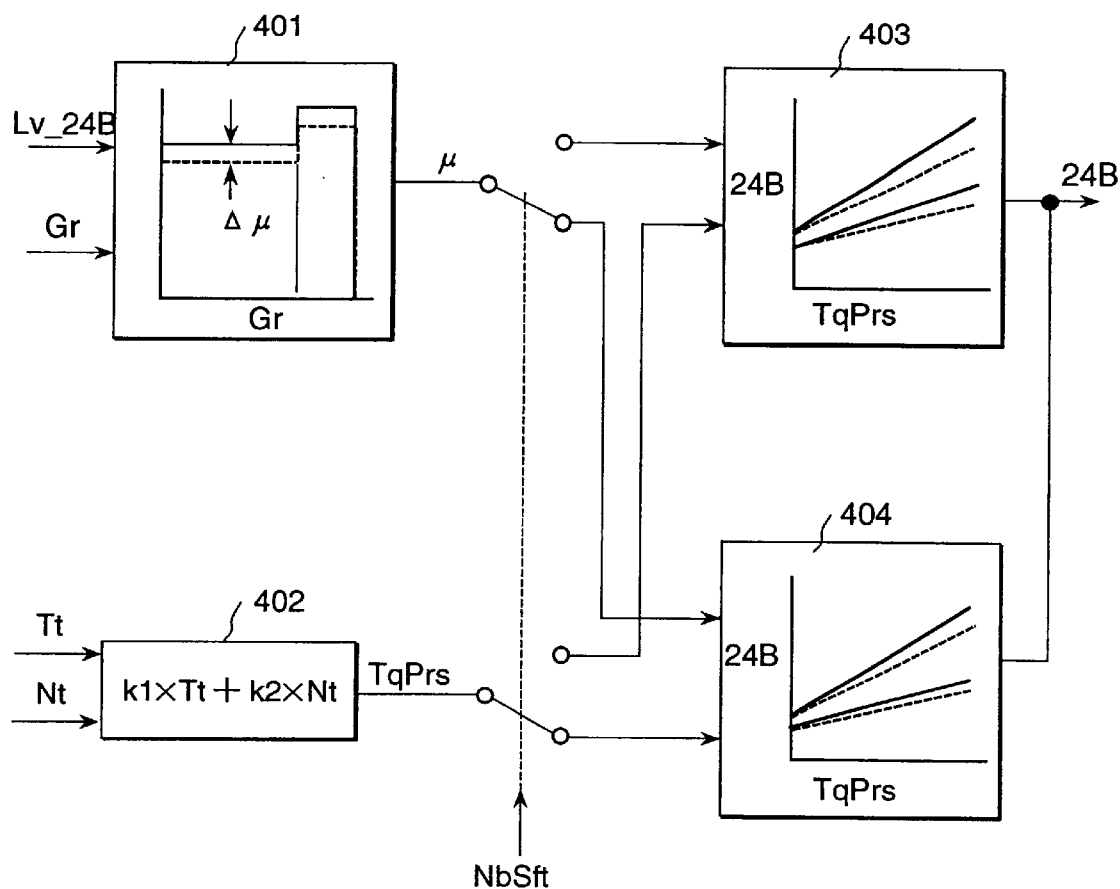
FIG. 4 is a control block diagram of the control method and apparatus for the automatic transmission of the first embodiment.

FIG. 4 is a control block diagram of the control apparatus for the automatic transmission or the control method for the automatic transmission of the first embodiment according to the present invention.

At first, in a friction coefficient calculation block 401, a coefficient of friction value $\mu$ which contributes to the shift of the clutch C is calculated. The chronological aging mentioned above is established by the gear ratio Gr of the automatic transmission. Further, in a case where a correction amount is inputted in advance and further the chronological aging of the clutch C is judged in accordance with the chronological aging judgement means, as shown by a dotted line in FIG. 4, a correction amount ($\Delta \mu$) for the value of the coefficient of friction u is outputted by subtracting from the initial value $\mu$.

Next, in an operation condition torque calculation block 402, an assumed executed input shaft torque Tt of the automatic transmission and a value Nt of a turbine rotation sensor signal are inputted. Herein, an operation condition torque TqPrs of the automatic transmission is calculated according to a formula 1.

$$TqPrs = k1 \times Tt + k2 \times Nt. \qquad 1$$

wherein k1, k2 are constants

The constants k1 and k2 mentioned above are the constants which are determined according to the shift pattern of the automatic transmission.

Next, using a shift pattern signal NbSft, the calculated coefficient of friction value $\mu$ and the calculated clutch supply hydraulic pressure command are changed over in every the shift pattern of the automatic transmission. For example, when the shift pattern signal NbSft is a 1–2 shift, the shift pattern signal NbSft is inputted into a 1–2 shift hydraulic pressure calculation circuit 403, and when the shift pattern signal "NbSft" is 2–1 shift, the shift pattern signal NbSft is inputted into a 2–1 shift hydraulic pressure calculation circuit 404, respectively. In the 1–2 shift hydraulic pressure calculation circuit 403, a most suited clutch supply hydraulic pressure command value 24B is calculated.

The supply hydraulic pressure command value 24B of the clutch C is calculated according to the following formula 2.

$$24B = 1/\mu \times k3 \times TqPrs + k4 \qquad 2$$

wherein k3, k4 are constants

As shown in the above formula 2, the clutch supply hydraulic pressure command 24B is defined with a first function of the, coefficient of friction value $\mu$ and the calculated operation condition torque TqPrs. Further, the constants k3 and k4 are the constants which are calculated from the characteristic value of a radius, etc., of the clutch C.

When the chronological aging is generated in the clutch C of the automatic transmission, as stated above, since the coefficient of friction value $\mu$ is corrected, as shown by the dotted line of FIG. 4, the clutch supply hydraulic pressure command is corrected. As a result, it is possible to correct the supply hydraulic pressure command 24B of all shifts to which the clutch C contributes. The above stated control block diagram can be employed similarly to the other clutches, for example the clutches A and B and the other shift patterns of clutches A and B.

To put in order the above stated contents, the friction coefficient calculation block for the clutch (the friction engagement means) and, further, the hydraulic pressure establishment calculation block in accordance with the operation condition and the value of the coefficient of friction are provided.

Further, in accordance with the chronological aging in the clutch of the automatic transmission, since the value of coefficient of friction is corrected, it is possible to reflect the chronological aging state in the automatic transmission to all shift patterns contributing to the clutch.

Figure 5:
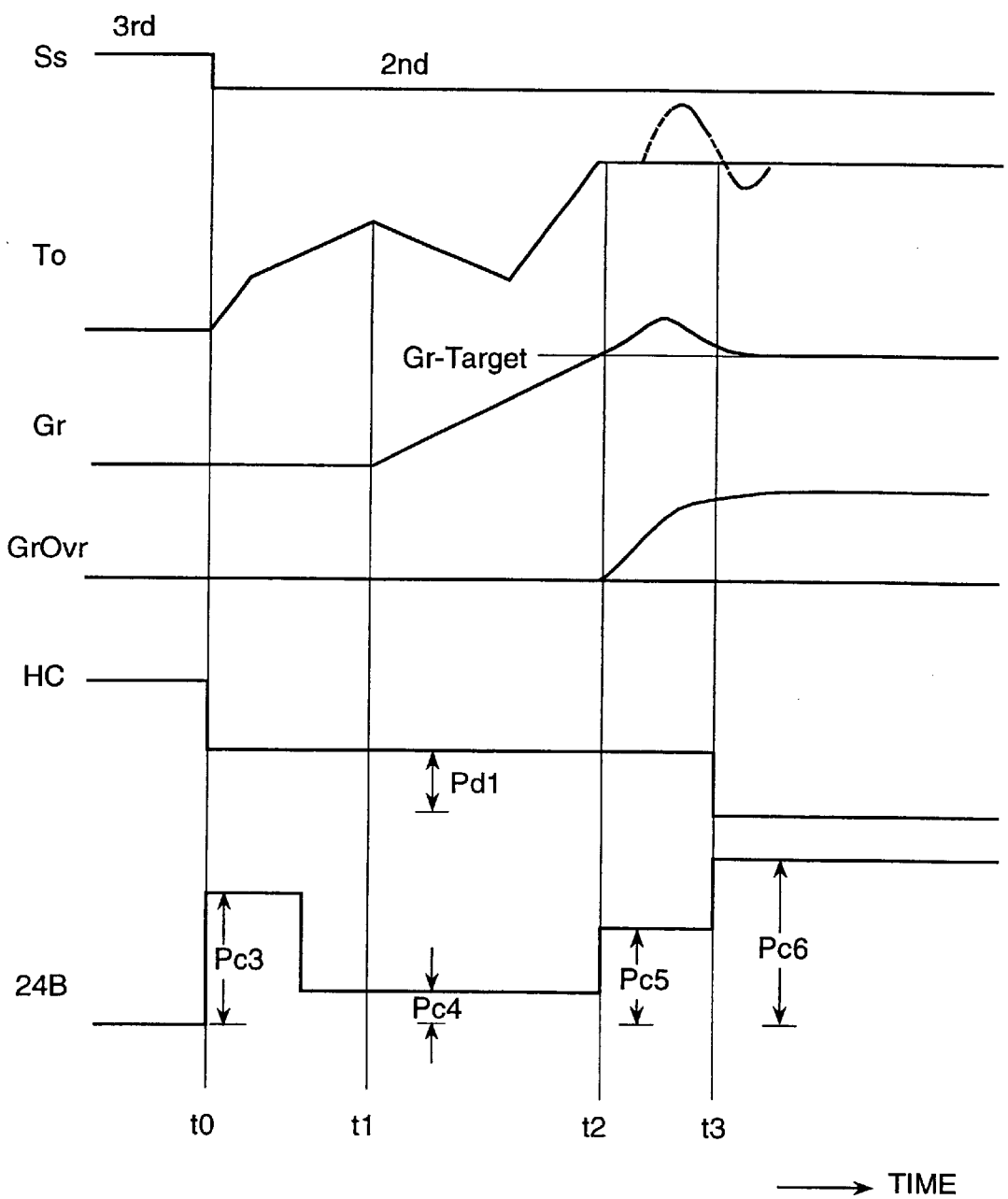
FIG. 5 is a time chart of one example of a chronological aging judgement of the clutch forming the friction engagement means of the control method and apparatus of the first embodiment.

FIG. 5 is a time chart showing one example of the chronological aging judgement in the automatic transmission. This time chart shown in FIG. 5 shows a chronological aging judgement of an engagement side clutch in a shift down.

A 3–2 shift will be explained as an example. At first, at the time t0 when a shift command signal is generated, by way of a disengagement side clutch hydraulic pressure command value HC, the clutch hydraulic pressure value Pd1, which provides disengagements under a predetermined shift time, is established. On the other hand, the engagement side clutch hydraulic pressure value 24B fills up the hydraulic pressure temporally with an engagement supply hydraulic pressure command value Pc3 and, after that, the engagement side clutch hydraulic pressure 24B holds a lowest hydraulic pressure value Pc4 in which the engagement is not carried out.

At the time t1, the clutch begins disengagement and the gear ratio Gr rises. Next, at the time t2, when the gear ratio Gr reaches a second gear ratio or a second shift Gr-Target, the engagement side clutch hydraulic pressure value 24B is established so as to have a hydraulic pressure Pc5, and the engagement clutch is changed over to a motive power.

After that, at the time t3, the disengagement side clutch hydraulic pressure command value HC is made zero, the engagement side clutch hydraulic pressure 24B is made the maximum hydraulic pressure value Pc6, and then the hydraulic pressure control during shifting in the automatic transmission is finished.

When, in the engagement side clutch of the automatic transmission, the chronological aging is generated, the automatic transmission has the characteristic as shown by a dotted line in FIG. 5. In other words, because of the hydraulic pressure shortage in the engagement time, the gear ratio Gr is overshot from the second gear ratio or the second shift Gr-Target, the output shaft torque To of the automatic transmission is fluctuated, and then the shift shock in the automatic transmission is increased. For the above stated reasons, a gear ratio overshoot amount GrOvr is monitored, and when the gear ratio overshoot amount GrOvr exceeds a limit value, it is judged as the chronological aging of the engagement side clutch in the automatic transmission.

A control apparatus for an automatic transmission and a control method for an automatic transmission of a second embodiment according to the present invention is shown in FIG. 6, FIG. 7 and FIG. 8.

FIG. 6 is a schematic view of an automatic transmission similar to that of FIG. 1. However, in FIG. 6, both the engine 101 and the automatic transmission 130 shown in FIG. 1 are omitted.

In FIG. 6, in an operation condition recognition means 132 in the interior portion of a control controller 131, an operation condition and a shift pattern of the automatic transmission are recognized and, against the recognized shift pattern, it recognizes which friction engagement means or which clutch contributes.

On the other hand, in the chronological aging judgement means 133, using a shift characteristic, the chronological aging state of the above stated friction engagement means 122a, 122b and 122c is judged. Next, in a pressure regulation command generation means 135, a hydraulic pressure command value is calculated; in such a hydraulic pressure command value, the good shift characteristic during shifting in the automatic transmission can be obtained and, further, the above stated hydraulic pressure command value is outputted to the respective linear solenoids 128a, 128b and 128c.

In the above stated pressure regulation command generation means 135, an operation condition of the automatic transmission and the hydraulic pressure command in response to the ATF (the automatic transmission fluid) oil temperature and the value of coefficient of friction of the friction engagement means (the clutch), etc. are stored and, further, the hydraulic pressure suited to the operation condition is calculated.

In the chronological aging judgement means 133 mentioned above, when the chronological aging of the friction engagement means (the clutch) reaches a predetermined beforehand stored constant level, through an alarm generation means 601, an alarm signal is outputted to an alarm member 602.

Up to now, when shift characteristic aggravation due to chronological aging of the clutch in the automatic transmission was present, the whole automatic transmission has been exchanged. However, according to the present invention, since the chronological aged friction engagement means or the deterioration aging clutch is specified and the alarm informs driver and, further, the adjustment factories, etc., on the basis of this information, with only the exchange of the friction engagement means component (the clutch component), it is possible to obtain a good shift characteristic in the automatic transmission.

FIG. 7 is a table which shows an example of the kinds of alarms and the contents of the alarms which are generated from the alarm generation means 601. As the contents of the alarms of this embodiment according to the present invention, in addition to the conventional contents about the alarms which are the fault signals of the respective solenoids A, B and C, the fault signal of the throttle valve sensor and the fault signal of the vehicle speed sensor, a result of the chronological aging diagnosis of the clutches A, B and C is added.

The contents of the respective fault signals are classified with a trouble code and according to a light-on and a light-off pattern of an indicator at a driver seat, and the above stated trouble code is generated.

FIG. 8 is a time chart showing an example of the trouble code. A key switch signal KeySW is placed in an "ON" state and at the same time a Power signal is placed in an "ON" state. A power lamp of the indicator is also lighted during the time t0 and, after that, the chronological aging diagnosis begins. At first, a pattern is expressed by a first pattern "10"; such a pattern is such that, during the time t1, the light-on is carried out and, during the time t2, the light-off is carried out.

The light-on during the time t3 is expressed by a second pattern "01". The first pattern and the second pattern are expressed by a number in which these patterns are repeated. Further, the first pattern and the second pattern are classified or divided into the light-off at the time t4.

In the example shown in FIG. 7, since the first pattern "10" is two times and the second pattern "01" is one time, a trouble code "21" is shown, meaning the chronological aging alarm of the clutch A, for example. Namely, the trouble code "21" is comprised by the first order of the times of the first pattern "10" and the order of the times of the second pattern "01".

In this embodiment, according to the present invention, since the chronological aging of the friction engagement means (the clutches) is generated by coding such as the trouble codes, the chronologically aged clutch can be specified using a simple method and, as a result, it is possible to exchange only the clutch component in the automatic transmission at the adjustment factories.

According to the control apparatus for the automatic transmission or the control method for the automatic transmission according to the present invention, even when the friction engagement means (the clutch) of the automatic transmission which is controlled by a friction engagement means (a clutch) to a friction engagement means (a clutch) is chronologically aged, the torque fluctuation in the automatic transmission can be restrained and a comfortable acceleration feeling in the automobile can be continued.

What is claimed is:

1. A control apparatus for an automatic transmission which is connected to an engine and having a predetermined friction engagement means for engaging and disengaging to practice a shift for the automatic transmission, comprising:

a hydraulic pressure regulation command generation means for regulating a hydraulic pressure which acts on said predetermined friction engagement means during shifting of the automatic transmission and for changing a hydraulic pressure regulation characteristic; and an operation condition recognition means for recognizing a shift pattern and an engine load;

the control apparatus further comprising a chronological aging judgment means for judging a chronological aging of said predetermined friction engagement means which contributes to the shift for the automatic transmission; and a characteristic value store means for storing a coefficient of friction of said predetermined friction engagement means;

wherein said characteristic value store means changes the coefficient of friction of said predetermined friction engagement means when said predetermined friction engagement means is judged to have undergone the chronological aging.

2. A control apparatus for an automatic transmission which is connected to an engine and having a predetermined friction engagement means for engaging and disengaging to practice a shift for the automatic transmission, comprising:

a hydraulic pressure regulation command generation means for regulating a hydraulic pressure which acts on said predetermined friction engagement means during shifting of the automatic transmission and for changing a hydraulic pressure regulation characteristic; and an operation condition recognition means for recognizing a shift pattern and an engine load;

the control apparatus further comprising a chronological aging judgment means for judging a chronological aging of said predetermined friction engagement means which contributes to the shift for the automatic transmission; and a characteristic value store means for storing a coefficient of friction of said predetermined friction engagement means.

3. A control apparatus for an automatic transmission which is connected to an engine and having a predetermined friction engagement means for engaging and disengaging to practice a shift for the automatic transmission, comprising:

a hydraulic pressure regulation command generation means for regulating a hydraulic pressure which acts on said predetermined friction engagement means during shifting of the automatic transmission and for changing a hydraulic pressure regulation characteristic; and an operation condition recognition means for recognizing a shift pattern and an engine load;

the control apparatus further comprising a chronological aging judgment means for judging a chronological aging of said predetermined friction engagement means which contributes to the shift for the automatic transmission;

a characteristic value store means for storing a coefficient of friction of said predetermined friction engagement means; and an alarm generation means for generating an alarm for a driver that said predetermined friction engagement means is in a chronological aging state;

wherein said characteristic value store means changes the coefficient of friction in the chronological aging state of said predetermined friction engagement means when said predetermined friction engagement means is judged to have undergone the chronological aging.

4. A control method for an automatic transmission which is connected to an engine in which a shift for the automatic transmission is practiced by engaging and disengaging a predetermined friction engagement means, comprising the steps of:

controlling an output shaft torque of the automatic transmission during shifting of the automatic transmission by regulating a hydraulic pressure which acts on said predetermined friction engagement means;

recognizing a shift pattern and an engine load;

judging a chronological aging of said predetermined friction engagement means which contributes to the shift for the automatic transmission;

storing a coefficient of friction of said predetermined friction engagement means in a memory; and changing the coefficient of friction of said predetermined friction engagement means stored in said memory when said predetermined friction engagement means is judged to have undergone the chronological aging.

5. A control method for an automatic transmission which is connected to an engine in which a shift for the automatic transmission is practiced by engaging and disengaging a predetermined friction engagement means, comprising the steps of:

controlling an output shaft torque of the automatic transmission during shifting of the automatic transmission by regulating a hydraulic pressure which acts on said predetermined friction engagement means;

recognizing a shift pattern and an engine load;

judging a chronological aging of said predetermined friction engagement means which contributes to the shift for the automatic transmission;

storing a coefficient of friction of said predetermined friction engagement means in a memory;

changing the coefficient of friction of said predetermined friction engagement means stored in said memory when said predetermined friction engagement means is judged to have undergone the chronological aging; and generating an alarm to a driver when said predetermined friction engagement means is judged to have undergone the chronological aging.

6. A control method for an automatic transmission which is connected to an engine in which a shift for the automatic transmission is practiced by engaging and disengaging a predetermined friction engagement means, comprising the steps of:

controlling an output shaft torque of the automatic transmission during shifting of the automatic transmission by regulating a hydraulic pressure which acts on said predetermined friction engagement means, storing a first engine load in a first shift pattern;

acting on a hydraulic pressure command value which acts on said predetermined friction engagement means in said first shift pattern;

changing a coefficient of friction in a chronological aging state of said predetermined friction engagement means stored in a memory when said predetermined friction engagement means is judged to have undergone the chronological aging; and correcting said hydraulic pressure command value which acts on said predetermined friction engagement means in said first shift pattern in a second shift pattern to which said predetermined friction engagement means contributes after said predetermined friction engagement means is judged to have undergone the chronological aging when the engine is operated under said first engine load in said first shift pattern.

* * * * *